United States Patent [19]

Martin

[11] Patent Number: 4,607,142

[45] Date of Patent: Aug. 19, 1986

[54] TRANSFORMER FLUX COMPENSATION CIRCUIT

[75] Inventor: Philip T. Martin, Raleigh, N.C.

[73] Assignee: ITT Corporation, New York, N.Y.

[21] Appl. No.: 635,035

[22] Filed: Jul. 27, 1984

[51] Int. Cl.[4] .............................................. H01F 27/38
[52] U.S. Cl. .............................. 179/16 AA; 179/170 R; 323/356
[58] Field of Search ............ 179/16 F, 18 FA, 16 AA, 179/70, 77, 170 D, 170 R; 323/356

[56] References Cited

U.S. PATENT DOCUMENTS

| | | | |
|---|---|---|---|
| 4,064,449 | 12/1977 | Macrander | 323/356 |
| 4,234,763 | 11/1980 | Dijkmans et al. | 179/77 |
| 4,241,239 | 12/1980 | Pernyeszi | 179/70 |
| 4,361,732 | 11/1982 | Wood | 179/18 AH |

FOREIGN PATENT DOCUMENTS 2812303 10/1979 Fed. Rep. of Germany ...... 323/356

OTHER PUBLICATIONS

"DC Flux Compensating Circuit for Reducing the Size of Transformers", Orengo et al., IBM Technical Disclosure Bulletin, vol. 21, No. 1, pp. 223-224.

Primary Examiner—Gene Z. Rubinson
Assistant Examiner—R. Vaas
Attorney, Agent, or Firm—John T. O'Halloran; Jeffrey P. Morris

[57] ABSTRACT

In a transformer-coupled interface circuit for interconnecting two-wire and four-wire telephone communication channels, there are provided a bucking winding in the transformer and a flux compensation circuit which drives the bucking winding. The flux compensation circuit includes a sensor of direct current current flowing through a primary winding of the transformer for applying power to a subscriber telephone. Also included within the compensation circuit is a current source responsive to the measured primary current for controlling the magnitude of the bucking winding current to track the primary current, thereby to reduce the flux in the transformer core and permit use of a smaller sized core. A stabilization circuit within the current source prevents oscillation resulting from feedback and reactive circuit components.

5 Claims, 1 Drawing Figure

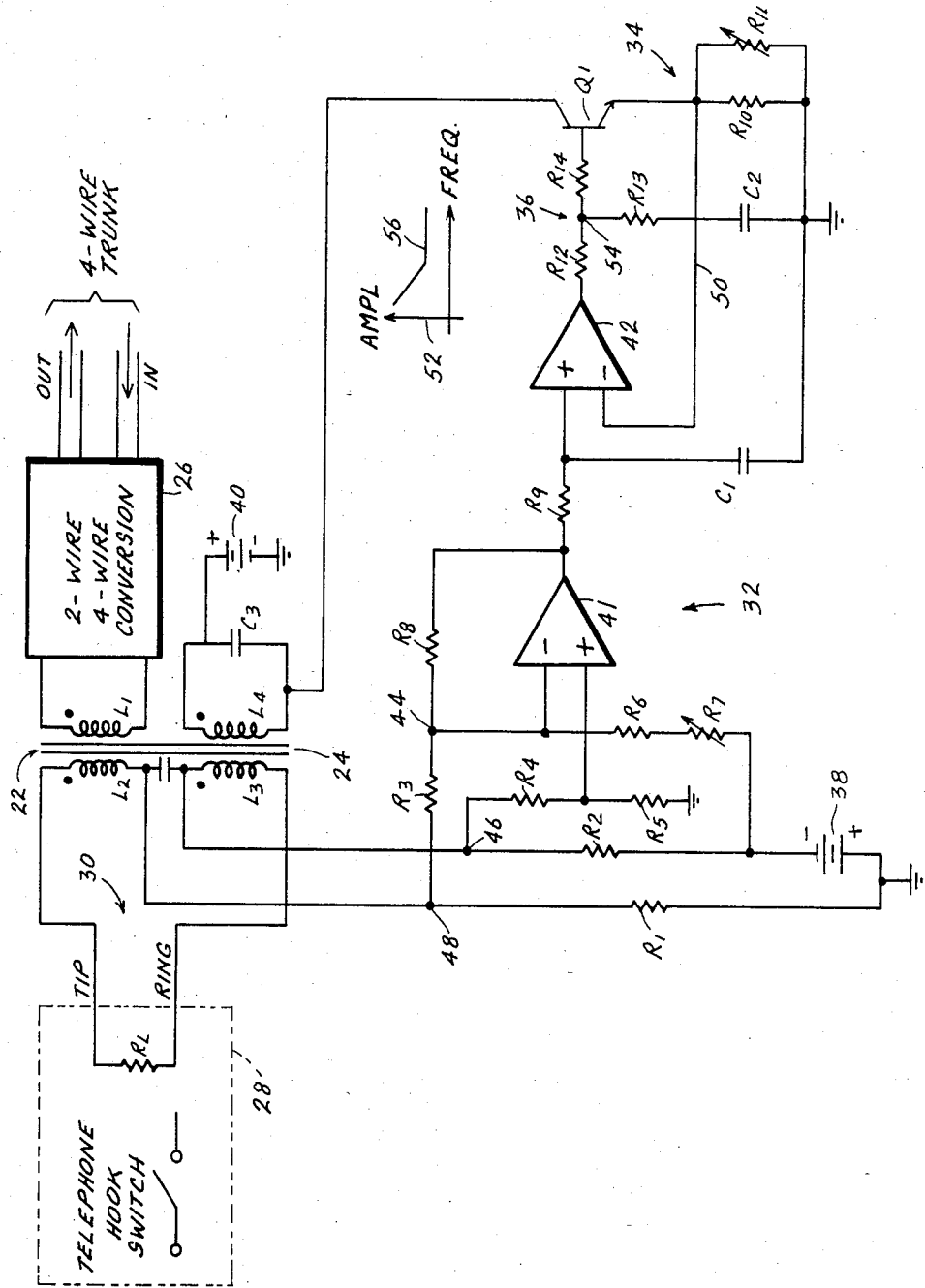

TRANSFORMER FLUX COMPENSATION CIRCUIT

BACKGROUND OF THE INVENTION

This invention relates to interface circuitry which interconnects two-wire and four-wire communication channels such as telephone communication channels. More particularly, the invention is directed to a flux compensation circuit in a transformer-coupled interface circuit utilized in the supplying of direct current to a telephone or similar communication device.

In communication systems, particularly telephony, it is common practice to transmit signals between a subscriber station and a central switching office via a two-wire bidirectional communication channel. Between central offices, communication is implemented frequently by use of a four-wire communication channel comprising a pair of two-wire channels for communicating in opposite directions. An interface circuit, or SLIC connects the two-wire channel with the four-wire channel. The SLIC directs the signal transmission between the two-wire bidirectional channel and the input and the output portions of the four-wire communication channel while inhibiting any coupling of incoming and outgoing communications between the corresponding portions of the four-wire communication channel.

One form of interface circuit employs transformer coupling between a subscriber telephone line and conversion circuitry wherein the incoming and the outgoing portions of the four-wire channel connect with the bidirectional subscriber two-wire channel. Communication signals are coupled via the transformer. An example of a prior-art transformer coupling in such interface circuitry is depicted in FIG. 1 of U.S. Pat. No 4,161,633 issued in the name of R. Treiber on July 17, 1979 and assigned to the assignee hereof. The primary side of the transformer connects with the subscriber line and, in addition to the coupling of communication signals, is also employed for applying direct current from a central office battery to power a telephone on the subscriber line. The transformer circuit is convenient and often used because it provides the two functions of coupling communication signals and the direct power.

A problem arises in that transformers tend to be substantially larger than other electronic components in the interface circuit, the magnetic core of the transformer is considerably heavier than other components, and the cost of the transformer increases with increasing size of the transformer. While a relatively small transformer may be employed for the single task of communicating voice and data signals over the telephone line, the additional task of providing the direct current power to the subscriber telephone line has necessitated a larger core so as to prevent saturation of the core by the presence of the direct current. It is readily appreciated that any saturation or near saturation of the core would decrease the inductance of each winding of the transformer and reduce the coupling between primary and secondary windings. Thus, the transformer could no longer effectively couple the communication signals in the event that the direct current were to saturate the core. As a result, the transformers utilized for the two functions of coupling the signals and the power must be of significantly larger size than would be required for only the coupling of communication signals.

SUMMARY OF THE INVENTION

The foregoing problem is overcome and other advantages are provided by a subscriber line interface circuit employing transformer coupling and wherein, in accordance with the invention, the flux compensation, or cancellation, circuit is incorporated within the interface circuit so as to substantially remove the flux associated with the task of supplying the direct current power to a subscriber telephone. Thereby, the transformer can be constructed of substantially smaller size and have significantly lower cost by virtue of a smaller and lighter core than has heretofore been possible.

In accordance with the invention, the compensation circuit includes a sensor of the direct current flowing serially from a power source via the primary windings of the transformer and the subscriber line to the subscriber telephone. The transformer is provided with an output winding for communication of signals to a four-wire telephone channel, and is further provided with a bucking winding powered by the compensation circuit for introducing a flux which bucks the applied flux from the primary windings. A current source is driven by the sensor and applies current to the bucking winding in accordance with the magnitude of the current sensed in the primary windings. Thereby, the compensation circuit tracks the magnitude of the current in the primary winding to provide a bucking current proportional to the primary current so as to cancel the flux induced by the direct current in the primary windings.

In accordance with a further feature of the invention, a lag-lead stabilization network is connected between the sensor and the current source for stabilizing the operation of the current source. Included within the stabilization network is a bypass capacitor which decreases the sensitivity of the sensor and the current source to changes in the magnitude of primary current, thereby insuring that the compensation operation does not interfere with the transmission of voice and data signals. It is noted that the sensor and current source circuitry involve reactive components, namely the foregoing capacitance and inductance of the transformer windings and, accordingly, any tendency towards oscillation is inhibited by the stabilization network.

BRIEF DESCRIPTION OF THE DRAWING

The aforementioned aspects and other features of the invention are explained in the following description taken in connection with the accompanying drawing wherein the sole FIGURE shows a portion of a telephone interface circuit, the portion including the compensation circuit and the bucking winding of the invention.

DETAILED DESCRIPTION

The invention is useful generally in telephony and other forms of communication systems, and is readily demonstrated with reference to a telephone system employing a transformer coupled SLIC. Accordingly, the ensuing description will be directed to a telephone system, it being understood that the description applies also to other forms of communication systems.

With reference to the drawing, there is shown a portion of an interface circuit 20 employing the invention in a telephone system. The circuit 20 comprises a transformer 22 having four windings L1–L4 wherein L1 is an output winding, L2 and L3 are input primary windings, and L4 is a bucking winding. The four transformer windings are magnetically coupled by a core 24 of magnetic material. The output winding L1 connects with a conversion unit 26 of well known circuitry which couples the ingoing and outgoing portions of a four-wire trunk communication channel to the windings L1. Both data and voice signals can be coupled by the conversion unit 26 to the winding L1, and via the winding L1 and the transformer 22 such signals are transmitted to a subscriber telephone 28. The telephone 28 is connected to the primary windings L2 and L3 by a subscriber telephone line 30 having tip and ring wires and presenting a line impedance RL. Included within the telephone 28 is the well known hook switch which permits increased current to flow through the line 30 when the telephone handset is lifted from the cradle.

Included within the interface circuit 20 is a compensation circuit which comprises a sensor 32 of current in the primary windings L2 and L3, a current source 34 which drives the bucking winding L4 in response to a sensing of the current by the sensor 32, and a stabilization network 36 interconnecting the sensor 32 and the current source 34. The direct current power for the subscriber line 30 is provided by a battery 38, typically 50 volts, the positive terminal thereof being grounded. Current from the battery 38 is coupled via resistors R1 and R2 which connect the battery terminals respectively to the windings L2 and L3 through which the current flows to the tip and ring wires. Also included within the interface circuit 20 are an additional twelve resistors R3–R14 and four capacitors C1–C4. Power for the current source 34 is provided by a second battery 40, typically five volts. Also included in the interface circuit 20 are two operational amplifiers 41–42 and a transistor Q1.

The two input windings L2 and L3 are serially connected by the capacitor C4 which passes voice and data signals while blocking the flow of direct current. Thereby, the two input windings L2 and L3 function as a single primary winding connected between the tip and ring wires. A typical value of capacitance for the capacitor C4 is 2.2 microfarads. The capacitor C3 serves to bypass voice and data signals which may be induced in the bucking winding L4 so that the signals do not reach the current source 34. The typical value of capacitance for the capacitor C3 is one nanofarad.

The current sensor 32 comprises the amplifier 41 and a set of resistors connecting the amplifier 41 to the path of direct current from the battery 38 to the subscriber line 30. The resistors R4 and R5 are serially connected between the junction of the resistor R2 and the winding L3, the resistors R4 and R5 joining at a node which connects with the positive (non-inverting) input terminal of the amplifier 41. The resistors R3, R6, and R7 are serially connected together, the resistor R3 being connected to the junction of the resistor R1 with the winding L2, and the resistor R7 connecting with the negative terminal of the battery 38. The resistors R3 and R6 connect together at a node 44 which is connected to the negative (inverting) input terminal of the amplifier 41. The resistor R8 is a feedback resistor connected between the output terminal of the amplifier 41 and the node 44. The output signal of the amplifier 41 is coupled via the resistor R9 to the positive input terminal of the amplifier 42, the capacitor C1 being connected between the positive input terminal of the amplifier 42 and ground.

In operation, the flow of direct current from the battery 38 induces voltage drops across the resistors R1 and R2. These voltage drops are proportional to the direct current in the subscriber line 30. The series connection of the resistors R4 and R5 serve as a voltage divider for providing a voltage proportional to the voltage at node 46 to the positive input terminal of the amplifier 41. Similarly, the series combination of resistors R3, R6, and R7 provide a voltage proportional to the voltage at node 48 to the negative input terminal of the amplifier 41. The difference in voltages between the two input terminals of the amplifier 41 is a measure of the voltage drops across the resistors R1 and R2 and, accordingly, of the current provided by the battery 38. The resistor R8 provides negative feedback to the amplifier 41 and a fixed amount of gain based on the magnitude of resistance of the various resistors, as is well known. The resistor R7 is of variable resistance and is manually adjustable to set a desired level of zero input voltage across the input terminal of the amplifier 41. The resistor R7 is used, therefore, for initial alignment of the interface circuit 20.

The capacitor C1 serves to bypass to ground any voice and data signals which may be received by the amplifier 41 from the primary windings L2 and L3. Thereby, the capacitor C1 inhibits the current source 34 from responding to perturbations in the primary current associated with voice and/or data signals.

The current source comprises the amplifier 42, the transistor Q1, and the resistors R10–R11. The amplifier 42 and the transistor Q1 are coupled together by the stabilization network 36 which comprises the capacitor C2 and the resistors R12–R14.

In operation, the output signal of the amplifier 41 as coupled to the amplifier 42 is applied via the network 36 to the base terminal of the transistor Q1. In the network 36, the resistors R12 and R14 are serially connected between the output terminal of the amplifier 42 and the base terminal of the transistor Q1. One terminal of the resistor R13 is coupled to the junction of the resistors R12 and R14, while the other terminal of the resistor 13 connects via the capacitor C2 to ground. The emitter terminal of the transistor Q1 is connected via the parallel combination of the resistors R10–R11 to ground. Current flowing through the emitter terminal of the transistor Q1 flows through the parallel combination of the resistors R10–R11 to ground and develops a voltage proportional to the current across the parallel combination of the resistors R10–R11. This voltage is coupled back via line 50 to the negative input terminal of the amplifier 42, this constituting a negative feedback signal which constrains the emitter current to follow the output voltage of the amplifier 41.

The serial combination of the resistor R13 with the capacitor C2 introduces a reduction in amplitude at low frequencies as shown in the graph 52 located in the drawing adjacent the network 36. At the node 54 joining the resistors R12 and R13, the resulting amplitude is that of a lag lead network, as portrayed in the graph 52, with the break point 56 occuring at a frequency of approximately 200 Hertz. At higher frequencies, there is essentially no phase shift to the coupling of signals between the amplifier 42 and the transistor Q1.

The resistor R11 is variable to permit manual adjustment of the magnitude of the feedback voltage on line 50. The adjustment of the resistor R11 also alters the gain of the feedback loop of the current source 34, which gain may be manually adjusted during initial alignment of the interface circuit 20. It is also noted that the overall response of the current source 34, including the response of the network 36 exhibits maximum responsivity to the direct current of the battery 38 and reduce responsivity to signals associated with the voice and data coupled via the transformer 22.

The current drawn by the transistor Q1 is provided by the battery 40, the negative terminal of which is grounded. The positive terminal, via its connection with the winding L4, provides the flow of transistor current via the conductor L4 to the collector terminal of the transistor Q1, and then via the emitter terminal and the parallel combination of resistors R10–R11 to ground. In particular, it is noted that the transistor current flows through the bucking winding L4 to provide a flux in the core 24 which opposes the flux generated by the primary direct current. The polarities of the respective windings L1–L4 are indicated by dots appended adjacent the respective winding in the drawing. This polarity, and the direction of positive current flow through the transistor Q1 provides for the bucking flux.

The resistors R12–R14 inhibit any oscillation which might otherwise occur due to the presence of the conductance of the winding L4 and the presence of the capacitance of the capacitors C2 and C3 as well as any stray capacitance within the transistor Q1 itself. In the absence of the resistors R12–R14, various oscillations have been observed including oscillations at frequencies well above 10 megahertz (MHz), oscillation at 250 kilohertz (kHz), a blocking oscillator mode at 250 kHz, and a fourth mode at a lower frequency of approximately 60 kHz. All of these modes are inhibited by the stabilization network 36.

The resultant cancellation of the flux associated with the primary direct current permits the size of the transformer 22 to be substantially reduced in that the core 24 need be large enough only to pass the variations in current and voltage associated with voice and/or data signals coupled via the transformer 22. In the absence of the foregoing compensation and the bucking flux, a substantially larger cross-sectional area would be necessitated in the core 24 so as to prevent saturation or near saturation of the core 24, which would impair the capacity of the transformer 22 for coupling the voice and/or data signals.

In the construction of the interface circuit 20, the following component values have been utilized. The resistance values in kilohms are as follows: R1=R2=0.25, R3=R4=100, R5=2.0 (approximately), R6 plus R7=100 (Approximately), R8=2.0, R9=50, R12=3.7, R13=0.05, and R14=0.5. The capacitance of the capacitors C1 and C2 are, respectively, 0.1 and 0.22 microfarads.

It is to be unnderstood that the above-described embodiment of the invention is illustrative only, and that modifications thereof may occur to those skilled in the art. Accordingly, this invention is not to be regarded as limited to the embodiment disclosed herein, but is to be limited only as defined by the appended claims.

What is claimed is:

1. In a transformer-coupled interface circuit for interconnecting two-wire and four-wire telephone communication channels, a transformer flux compensation circuit comprising:
   a transformer having plural windings magnetically coupled by a common core, a first and a second of said windings being connected to a two-wire telephone channel having tip and ring wires, said first winding being connected between one terminal of a direct current (DC) source of electric power and said tip wire, said second winding being connected between a second terminal of said power source and said ring wire, a third of said windings being a bucking winding, and a fourth of said windings being coupled to said four-wire telephone communication channels, said power source inducing a primary current flow via said first and said second windings into said two-wire channel;
   means coupled between said first winding, said second winding, and said power source for sensing a flow of said primary current in said two-wire channel;
   means driven by said sending means for applying current to said bucking winding, the amount of current supplied by said applying means being sufficient to induce a flux in said core by said bucking winding which cancels a flux induced in said core by the flow of said primary current in said first and said second windings, thereby permitting a reduction in the size of said core;
   a lag-lead stabilization network connected within said applying means for stabilizing the operation of said applying means; and wherein
   said applying means comprises a driver amplifier and a transistor driven by said amplifier; and wherein
   said stabilization network comprises two resistors serially connected along a signal path between said driver amplifier and said transistor, and a capacitive branch grounding a junction of said two resistors.

2. In an interface circuit, a compensation circuit according to claim 1 wherein said capacitive branch comprises a third resistor and a capacitor connected together in series.

3. In an interface circuit, a compensation circuit according to claim 2 wherein said transistor of said current applying means is serially connected with said bucking winding, the current of said applying means flowing via said transistor into said bucking winding.

4. In an interface circuit, a compensation circuit according to claim 3 wherein said current applying means includes feedback means responsive to said current in said transistor for generating a feedback signal, said feedback signal being coupled to an input terminal of said driver amplifier.

5. In an interface circuit, a compensation circuit according to claim 4 wherein said sensing means includes a bypass path to voice and data signals transmitted via said interface circuit, said bypass path inhibiting a response of said current applying means to such voice and such data signals, thereby permitting the current in said bucking winding to track the primary current in said first and said second windings.

* * * * *